(12) United States Patent
Otte

(10) Patent No.: US 6,314,413 B1
(45) Date of Patent: Nov. 6, 2001

(54) METHOD FOR CONTROLLING PROCESS EVENTS USING NEURAL NETWORK

(75) Inventor: Ralf Otte, Weinheim (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 09/133,931

(22) Filed: Aug. 13, 1998

(30) Foreign Application Priority Data

Aug. 13, 1997 (DE) .............................................. 197 34 947

(51) Int. Cl.[7] .................................................. G06F 15/18

(52) U.S. Cl. ................................ 706/15; 706/23; 706/907

(58) Field of Search ................................ 706/15, 23, 907

(56) References Cited

U.S. PATENT DOCUMENTS

| | | | |
|---|---|---|---|
| 5,048,100 | 9/1991 | Kuperstein | 382/157 |
| 5,222,210 * | 6/1993 | Leivian | 706/11 |
| 5,448,681 * | 9/1995 | Kahn | 706/23 |
| 5,602,886 * | 2/1997 | Gross et al. | 376/253 |
| 5,796,631 * | 8/1998 | Iancu et al. | 713/340 |
| 5,809,490 * | 9/1998 | Guiver et al. | 706/16 |
| 5,859,773 * | 1/1999 | Keeler et al. | 706/906 |
| 5,937,398 * | 8/1999 | Maeda | 706/32 |

FOREIGN PATENT DOCUMENTS

| | | | |
|---|---|---|---|
| 0829809 A1 * | 3/1998 | (EP) . | |
| 2 277 151 A | 10/1994 | (GB) . | |

OTHER PUBLICATIONS

Tanaka et al, "Application of Kohonen's Self–Organizing Network to the Diagnosis System for Rotating Machinery", IEEE International Conference on Systems and Cybernetics, Oct. 1995.*

Jannie S. J., "The Tracking of Changes in Chemical Processes Using Computer Vision and Self–Organizing Maps", IEEE ICNN, Dec. 1995.*

"Real–Time Navigation of a Mobile Robot Using Kohonen's Topology Conserving Neural Network"; I.J. Nagrath et al.; ICAR 1997; pp. 459–464, Jul. 1997.*

"A Self–Organized CMAC Controller"; Mo–yuen Chow, Alberico Menozzi; Department of Electrical and Computer Engineering; North Carolina State University; pp. 68–72, 1994.*

International publication WO 94/20887 (Keeler et al.), dated Sep. 15, 1994.

Andreas Zell: "Simulation Neuronaler Netze", Addison–Wesley (Deutschland) GmbH, $1^{st}$ ed. 1994, pp. 179–187, [simulation of neural networks].

Teuvo Kohonen: "Self–Organized Formation of Topologically Correct Feature Maps", Biol. Cybern. 43, 1982, pp. 59–69.

Benoit B. Mandelbrot: "Die fraktale Geometrie der Natur", Birkhäuser Verlag 1991, pp. 26–31–42 [the fractal geometry of nature].

James Gleick: "CHAOS—die Ordnung des Universums", Knaur, 1990, pp. 146–151 [CHAOS—making a new science].

Wolfgang Trümper: "A neural network as a self–learning controller", at Automatisierungstechnik 40 (1992), pp. 142–147.

(List continued on next page.)

Primary Examiner—George B. Davis
(74) Attorney, Agent, or Firm—Herbert L. Lerner; Laurence A. Greenberg; Werner H. Stemer (57) ABSTRACT

The invention relates to a method for controlling process events of a technical plant. In order to permit a simultaneous and coherent assessment of relevant process variables of the plant, it is proposed to use a neural analysis on the basis of self-organizing neural maps to evaluate the relevant process variables in relation to one another by realizing a topology-maintaining nonlinear projection of data from the relevant process variables onto a multidimensional neural map.

6 Claims, 5 Drawing Sheets

OTHER PUBLICATIONS

Didier Keymeulen: :On the Self–Organizing Properties of Topological Maps, XP–002085067.

Yair Bartal et al.: "Nuclear Power Plants Transient Diagnostics Using LVQ or Some networks don't know that they don't know", XP 000510508.

Heikki Hyötyniemi: "State–Space Modeling Using Self–Organizing Maps" XP–002085068.

A. Syed et al.: "Real Time Monitoring and Diagnosing of Robotic Assembly with Self–Organizing Neural Maps" XP–000402656.

* cited by examiner

METHOD FOR CONTROLLING PROCESS EVENTS USING NEURAL NETWORK

BACKGROUND OF THE INVENTION

Field of the Invention

The invention relates to a method for controlling process events of a technical plant.

The method is suitable for the optimization and analysis of process events of a power station or a power plant.

It is generally known to detect individual process variables by measurement, to consider them and also to evaluate them as a function of the process state. In addition, it is known to model and to predict individual process variables by applying mathematical, statistical or neural algorithms. One disadvantage of these signal-supported methods is that in regions in which a large number of process signals are observed, the interpretability and comprehensibility—and therefore the current knowledge about the process state—is lost. When hundreds of process variables change simultaneously during transient process events, no estimate of the current process state can be obtained, and in particular it is impossible to assess the course of the transient process event.

With conventional methods, when non-linear relationships exist between the process variables, it is not possible to make any determination as to which process variables have to be changed simultaneously or what percentage change is suitable, in order to transfer from a current process state into a desired process state. A well-known technique for solving this problem is to carry out a what-if simulation for previously firmly defined steady-state operating regions, during which the influence of each individual process variable on the desired target variable is ascertained. One or more input signals can be changed, and the resulting behavior of the target variable can be calculated. A disadvantage of this method is that lengthy trial and error is required to obtain information as to which process variables have to be set and to which value a particular process variable must be set in order to move the process in a required or desired direction.

The transient process regions present a major problem because there is a lack of information about what can actually be viewed as a desired event in these regions. A combination of, for example, 200 measurement signals cannot readily be viewed to see whether it represents an optimum or a faulty process state.

SUMMARY OF THE INVENTION

It is accordingly an object of the invention to provide a method of optimizing and analyzing process events of a power station plant, which overcomes the hereinaforementioned disadvantages of the heretofore-known methods.

With the foregoing and other objects in view there is provided, in accordance with the invention, a method that permits a simultaneous and coherent assessment and indication of the relevant process variables of a technical plant. In accordance with the method, for each operating point at any particular time in time in the plant, information about the basic influencing variables is obtained, and process variable changes which are necessary in order to move from the current state into a desired operating state are prescribed. In addition, a visualization method enables an optimal process state to be distinguished from a non-optimal process state.

With the foregoing and other objects in view there is provided, in accordance with the invention, a method for controlling process events of a technical plant, which comprises: collecting or combining the variables relevant to a process; realizing a topology-maintaining nonlinear projection of data from the variables onto a multidimensional self-organizing neural map (SOM); evaluating the variables in relation to one another using the neural map; and controlling process events in accordance with the evaluation step.

In accordance with an added feature of the invention, the collecting step comprises collecting the variables into a vector.

In accordance with an additional feature of the invention, the technical plant is a power station plant or a portion of a power plant.

In accordance with another feature of the invention, a trajectory of process events displayed by connecting visualized process states graphically; and reference channels with adjustable tolerance widths are displayed on the map.

In accordance with a further feature of the invention, sequences of process states are evaluated using the reference channels.

In accordance with again an added feature of the invention, the process is steered through one of the reference channels.

In accordance with again an additional feature of the invention, the process is steered through one of the reference channels using a process steering means.

In accordance with again another feature of the invention, the method further comprises the steps of detecting if a trajectory deviates from the reference channel on the neural map; evaluating a winner rate neuron representing the state; and bringing the process back into the reference channel.

With the above and other objects in view there is also provided, in accordance with the invention, a method of controlling process events of a technical plant. The method comprises the steps of:

selecting process variables;

developing a self-organizing, neural network in a state space of a plant, on a basis of a self-organizing neural algorithm using process values of the process variables;

representing the self-organizing neural network as a neural map;

determining plant states from the process variables;

producing a reference channel of permissible process events by projecting the plant states onto the neural map;

recording the process events by linking the neural map to the process;

displaying a trajectory on the neural map;

monitoring whether the trajectory remains within or deviates from the reference channel; and steering the process of the technical plant over the neural map in real terms in the state space.

In accordance with yet another feature of the invention, the plant states are projected onto the neural map with a winner-takes-all algorithm or with a winner-takes-most algorithm.

In accordance with a concomitant feature of the invention, the process values of the process variables are conditioned prior to the developing step.

The current process state is represented on this SOM and can thus be compared with other process states in context. If the current process state is remote from a desired process state, it is possible for the necessary process variable combination to be output in order to get from the current to the desired process state.

As a result of an integrated approach, values of the individual process variables and their mutual influences on one another are taken into account.

In neural theory, a self-organizing map (SOM) is understood to be a "self-organizing neural network", in which all the neurons are arranged alongside one another. The self-organizing neural network is a term which has been introduced for a specific class of neural networks which structure themselves using input signals. See, A. Zell "Simulation Neuronaler Netze" [Simulation of Neural Networks], Addison-Wesley, 1994, pp. 179 to 187, which is herein fully incorporated by reference. As distinct from conventional neural networks, the spatial location of the individual neurons and their neighborhood relationships play an important role in the SOMs.

In system theory, the state space of a plant denotes the n-dimensional vector space in which the process data can be plotted one above another. For example, a data example or sample, that is to say a vector having the values of the n process variables at a time $t_0$, corresponds to a point in this state space. In the following text, an input space will be understood to mean precisely this state space. The output space is the 2-dimensional space which is depicted on the map.

With the aid of the SOMs, it is possible for socalled topology-maintaining projections to be realized. In this context, topology-maintaining means that the points (data points) which are located close beside one another in the input space are also located close beside one another in the output space, that is to say on the map. The map therefore represents, in principle, a topology-maintaining, 2-dimensional window into the n-dimensional state space of the plant. In this case, n denotes the number of process variables. However, process values relating to the individual process variables must be present, since the method can operate only on the basis of data (the process values).

In a learning phase, following appropriate data preprocessing, a self-organizing neural network is supplied with the values of relevant process variables. The number n (the number of process variables) lies between 2 and several hundred. The necessary number of data examples or samples influences the result and should be relatively large. As one example the number of data examples or samples could =30*n. The data examples represent specific process states which are recorded at specific times. For example, the data may be present in the form of a matrix, the columns corresponding to the process variables and the rows to the data examples at the respective points in time.

Before the learning process is performed, the process data are preprocessed. First, the individual process variables are scaled to a predefined value. Subsequently, the individual process variables can be subjected to noise. This subjection to noise permits the further processing of generalized process events, since as a result it is no longer individual, randomly selected events but prototypes of events that are further processed.

The learning phase is carried out in two steps: first, the map is developed in the state space of the plant, then the plant states are visualized by applying a mathematical method.

The development of the self-organizing map (SOM) in the state space of the plant can be realized by a self-organizing algorithm based on the "neural algorithm of T. Kohonen".

The self-organizing neural algorithm was introduced by Kohonen in 1982. See T. Kohonen, "Self-organized formation of topologically correct feature maps" in Biological Cybernetics, 43, 59–69, 1982, which is herein fully incorporated by reference. Since data from process events do not always have to be subdivided into various data clusters, but may also occur as a discrete process trajectory (line) in a high-dimensional space, it is necessary for the neural algorithm and the visualization to be adapted appropriately. A process point is produced if the n process variables of a plant are combined to form an n-dimensional vector $$pv=(pv_1, pv_2, \ldots, pv_i \ldots pv_n) \quad (1)$$

at a time $t_0$; $pv_i$ denotes the ith component of the input vector. In this way, it is possible to produce process vectors at each time $t_m$ and to represent them in an n-dimensional coordinate system as a cloud of points, and this produces a process trajectory.

If the vectors pv, that is to say the data points at all times in the process sequence, are relatively close to one another, and if the fractal dimensionality (FD) of this structure is close to 1, the structure may be interpreted as a process trajectory.

Fractal dimensionality is a term introduced for structures in n-dimensional spaces. For instance, a line has an FD equal to 1, a surface has an FD equal to 2, a body has an FD equal to 3. Additionally, there are structures with a fractional FD. See, for example, B. Mandelbrot, "The Fractal Geometry of Nature", New York, Freeman, 1977; and J. Gleick, "Chaos-die Ordnung der Natur" [Chaos—the ordering of nature], Knaur Verlag, 1990, pp. 147–150, which are fully incorporated by reference herein.

The above-mentioned neural algorithm is able to organize itself on any n-dimensional structure (e.g. curve, surface or body). In this case, by using an iterative neural algorithm, the weight vectors w of all the neurons k on the map can be adapted to the input vectors pv of the process data, taking into account the neighborhood relationships of the neurons. The following definition is introduced for the vectors w:

$$w=(w_1, w_2, \ldots w_i, \ldots w_n), \quad (2)$$

where $w_i$ denotes the ith component of the weight vector of a neuron.

However, an applicable visualization of the process data may be realized only by modifying the SOM method. The following modification and parameterization are introduced:

First, two opposite corner neurons on the SOM are drawn at the start and at the end of the process trajectory. The corner neurons are fixed there mathematically by setting the weight vectors of these corner neurons equal to the process vectors. The weight vectors can be scaled, if necessary, at the beginning and at the end of the event.

Second, since the neural algorithm of T. Kohonen requires an infinitely long number of iterations to draw all or virtually all of the neurons onto the process trajectory, the self-organization must be timely broken off. It is broken off in such a way that about half of all the neurons are grouped on the trajectory and the other half are grouped around the trajectory. One heuristically ascertained possibility is, for example, to restrict the number of SOM iterations to the number of SOM neurons. Timely breaking off the iterations has the advantage that it is possible to use the produced maps to display process courses that deviate from a reference course.

Third, the neighborhood ordering on the SOM is fixed to a distance standard which depends on the fractal dimensionality FD of the input data. If the FD of the input data is, for example, between one and two, which is often the case for dynamic, technical processes, the best distance standard is the so-called Manhattan distance. When the distance standard is the Manhattan distance, each neuron on the map (with the exception of all the neurons at the edges) has precisely 4 neighbors; a NORTH neighbor, an EAST neighbor, a SOUTH neighbor and a WEST neighbor. These results may be derived from neural gas theory.

The visualization of the physical plant states takes place in accordance with a dynamic visualization method. In this method, the developed map is once again provided with the input vectors in a random sequence, and the current winner neuron is ascertained in accordance with a "winner-takes-all" algorithm. This algorithm states that the neuron whose weight vector is closest to the input vector wins. The statement "closest" is calculated by calculating a previously determined measure of distance, for example, the euclidian distance. The winner-takes-all algorithm is a method in which only the particular neuron which best satisfies a specific condition is active. All of the other neurons of the network or of the map are inactive (k−1 inactive neurons, with k equal to the number of neurons on the map). Here, this special condition is a minimum amount of distance between the current input vector and the weight vector of the individual neurons. See Hafner, "Neuronale Netze in der Automatisierungstechnik" [Neural networks in automation technology], Oldenbourg Verlag, 1994, in particular pages 17 to 25. The immediately hereinabove named reference is herein fully incorporated by reference.

For each respective winner neuron, an internal counter representing the winner rate, is incremented by the counter value one. At the end of this dynamic visualization, the winner rates of the individual neurons are coded into color values. For example, a high counter value can be represented as a light color. The neuron with the highest winner rate is, for example, displayed in white. Neurons with correspondingly small winner rates can be visualized darker. Neurons which have not won at all can receive a black color on the SOM. This algorithm produces a light channel on the SOM, the so-called reference channel, of possible and permissible process states. An expansion to the "winner-takes-all" algorithm is achieved by applying a "winner-takes-most" algorithm. With the winner-takes-most-algorithm, an internal counter is incremented not only for the winner neuron, but also for the jth, that is to say the second next, third next, fourth next . . . winner neuron. One possibility for the neuron M being, for example:

$$\text{win counter}^M = 1/j + \text{win counter}^M \qquad (3)$$

where M is equal to neuron M, and j is the position of the neuron in a list of the respective SOM responses to an applied input vector pv. With the "winner-takes-all" algorithm, the counter would be incremented by one only for the actual winner neuron ($j_{max}=1$). With the "winner-takes-most" algorithm, the respective maximum value for $j_{max}$ may be predefined. This measure permits the width of the reference channel and therefore the width of the tolerance band for the good-state of the process to be set on the map.

In the application phase of the map, determinations about the current and future process state may be made by building up and developing a trajectory of process states on this map by using a "winner-takes-all" or a "winner-takes-most" algorithm. An analysis of the individual process variable distributions on the map permits new types of process relationships to be detected. Back-transformation of the abstract representation of the map to the individual process variables permits causes for process deviations to be ascertained.

Other features which are considered as characteristic for the invention are set forth in the appended claims.

Although the invention is illustrated and described herein as embodied in a method for controlling process events, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The description of the method is organized into various method steps described below, and is explained by way of example with reference to the Figures.

Figure 1:
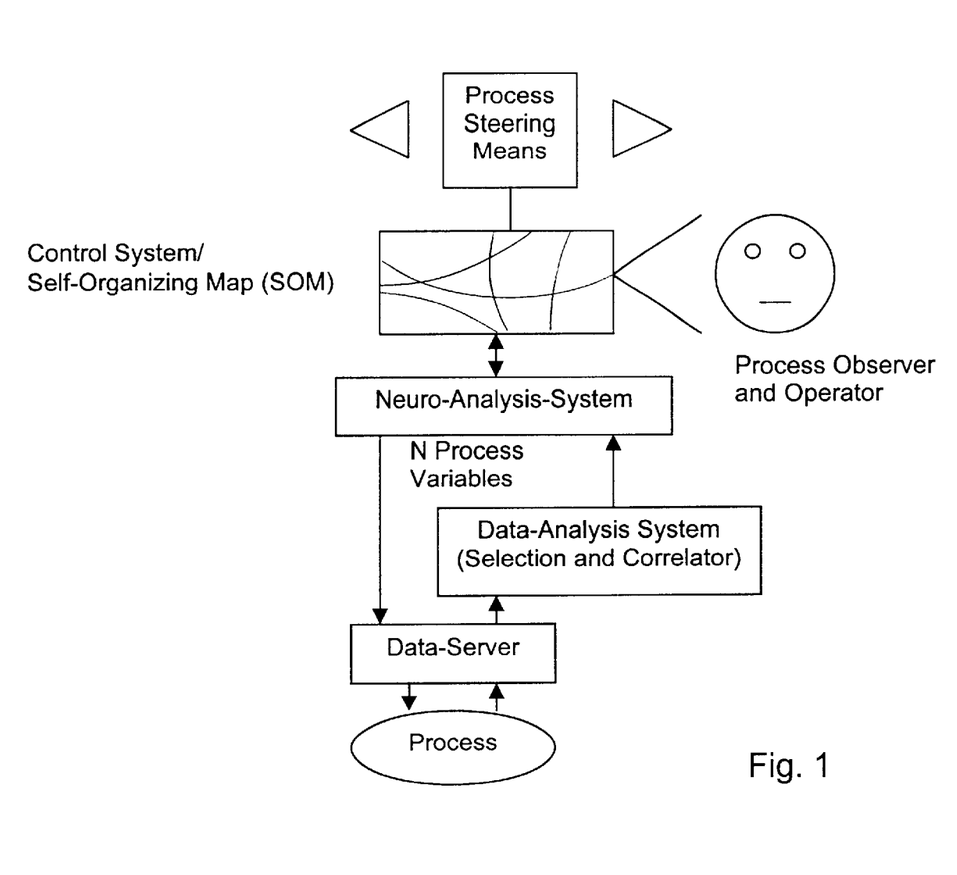
FIG. 1 shows a structure diagram showing the essential components of a system for carrying out the method.

FIG. 1 shows the structure of a system for carrying out the method for process analysis and diagnosis using a neural map.

Method Step 1: Recording and Selecting the Process Variables

The relevant data is recorded and conditioned. A data acquisition and conditioning system, for example, a data server based on a computer of a process control system, periodically collects process values from a technical plant, for example from a boiler of a power station plant. A data analysis system then subjects the selected and relevant data to correlation analysis in order to determine the independent measured variables that describe the process. After this, the relevant measured variables are scaled and subjected to noise.

Method Step 2: Learning Phase of the Map (Off-line)

V2.1. The self-organizing, neural network in the state space of the plant is developed based on a modified algorithm of T. Kohonen.

V2.2. The developed network is visualized as a map by applying a dynamic visualization method based on the respective winner rates of the neurons.

Figure 2:
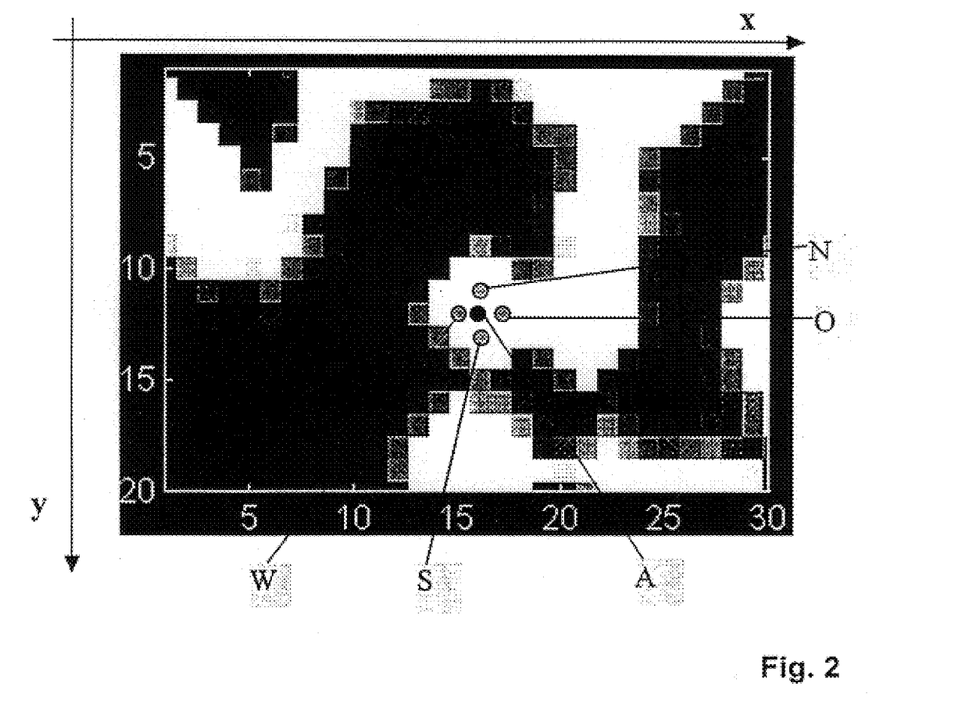
FIG. 2 shows a neural map with a "burnt-in" channel for allowed reference start-ups, the so-called reference channel (white channel)

FIG. 2 shows, a black/white illustration, of an example of a structured and color-coded neural map for various good reference start-ups of a boiler (light, coherent channel). It illustrates the projection and visualization of a plurality of load states of the boiler on a neural map having 20*30 neurons. In FIG. 2, the x-axis indicates the number of neurons in the x direction, and the y-axis indicates the number of neurons in the y direction. A current process state A and its immediately adjacent states N (north state), S (south state), W (west state) and O (east state) are illustrated.

The light channel or reference channel predefines the allowed process states for a normal cold start of the boiler. The dark regions on the map form the envelope between the allowed events, since they represent neurons which are grouped around the reference process trajectory in the state space of the plant.

By applying a "winner-takes-most" algorithm, it is possible to control the width of the channel and hence the setting for a later fault detection.

In this example each plant state is determined by 20 independent process variables, and is therefore 20-dimensional. The present method, however, makes it possible to carry out a projection onto only two dimensions (the SOM map), so considerably improved comprehensibility of the actual process states is achieved as compared to the individual consideration of all 20 process variables. The number of simultaneously evaluated process variables is not restricted to 20, but may be significantly higher. The number of process variables (20) has a priori nothing to do with the number of neurons (20*30). The number of neurons should be as large as possible, being restricted only by the computing power of the analytical computer.

Method Step 3: Application—Process Analysis with the Map (Off-line/On-line)

V3.1. The map is linked to the process and the current process state is displayed on the structured map.

In the application phase, that is to say during operation of the power station plant, the current process state is evaluated by means of a neural "winner-takes-all" algorithm, and is plotted on the previously structured and color-coded map. The current, generally high-dimensional, plant state can therefore be visualized in the context of other plant states. The spatial position of the current process state in the reference channel provides information about the current state of the plant. For example, state A in FIG. 2 is a fault-free state, since it lies in the white reference region.

V3.2. Graphical linking of winner neurons

In the application phase, each respective current winner neuron at the time $t_0$ is marked, for example, by a black circle. If these winner neurons are connected to one another, a trajectory of the current process states over time $t(t_0<t_1<t_2)$ is developed on the structured map. This trajectory will either be growing continuously or, in the case of a fixedly predefined length, be wandering on the map (not illustrated in FIG. 2).

Figure 3:
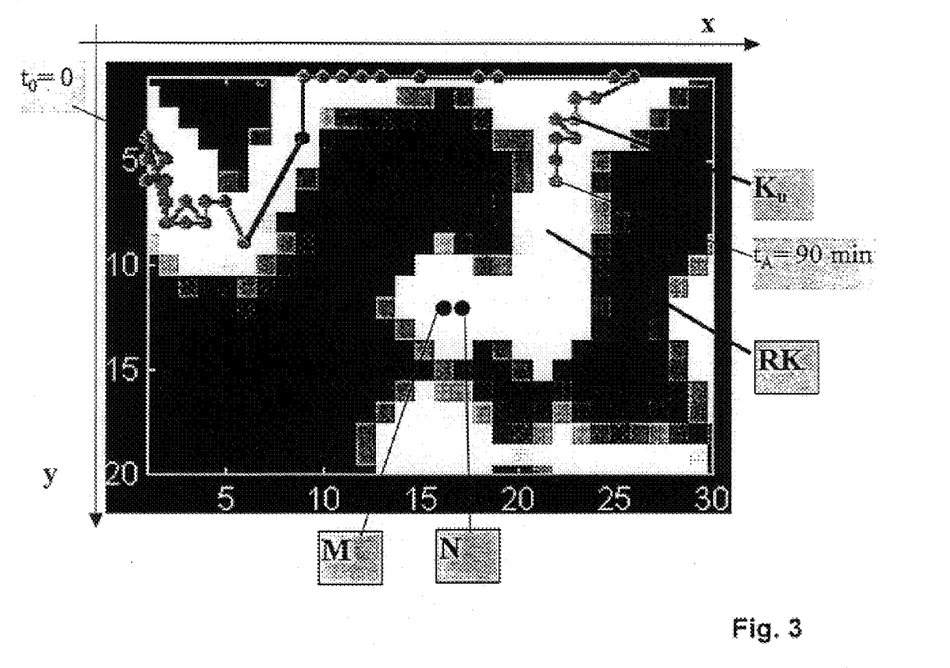
FIG. 3 shows a trajectory course when starting up a boiler (gray line within the reference channel)

FIG. 3 shows, a black/white illustration, of an example of a trajectory course $K_u$ on a color-coded, neural map having 20*30 neurons during the start-up and load change of a boiler over a time period of 90 minutes. The x-axis in FIG. 3 indicates the number of neurons in the x direction, and the y-axis indicates the number of neurons in the y direction. It can be seen that the start-up event runs exactly within the reference channel RK. It can be seen that the currently running highly complex event $K_u$, and not just an individual process state, can be correctly classified intuitively at a glance. The time $t_0$ is the starting time for the recording, for example at the beginning of the cold start. The time $t_A$ shows the position of the process state after 90 minutes.

Method Step 4: Application—Model Analysis by Means of SOM

In order to return from the abstract representation to the physical process, the weight distribution of the individual neurons can be analyzed, since the real values of the process variables are encoded in the weights. This means that, for each neuron on the map, it is possible to ascertain the associated process values of all of the basic process variables. A neuron on the SOM accordingly corresponds to a concrete state of the plant. The difference between two arbitrary neurons on the map may accordingly be ascertained by comparing the weight vectors w of these two neurons with each other. Since, two neurons M and N represent two different plant states M and N, the result obtained from a difference analysis is the differences for all of the process variables which bring about the difference between the process states M and N. The following equation illustrates the calculation by way of example:

$$\text{var}_i = abs(w_{i,tM} - w_{i,tN}) * \text{scal\_factor} \qquad (4)$$

The difference var$i$ for process variable pv$_i$ is given as the absolute magnitude abs of the difference between the corresponding components $w_i$ in the states M and N, multiplied by the scaling factor scal_factor. Starting with this difference, it is possible to ascertain the percentage difference diff$_i$, based on the measurement range of the process variables i, for each process variable pv$_i$ of the two plant states M and N:

$$\text{diff}_i = \text{var}_i/(\text{measurement range of } pv_i) * 100\% \qquad (5).$$

It is therefore possible to calculate the influences of the individual process variables pv$_I$ on the two process states M and N, and to represent them in an ordered list of influences of the process variables. This method therefore provides an analysis of the influence of all of the process variables on the overall process in the selected process state M. For each current process state or its representative neuron M and for a respective adjacent state or adjacent neuron N, the differences with respect to basic process variables can be ascertained. This analysis may be expanded if a selected process state M or A and all its adjacent states N, O, S, W, (in FIG. 2) were to be taken for the influence analysis.

Since this influence analysis can be recalculated for any desired process state M, that is to say for any operating point of the plant, it constitutes an expansion of present methods for process analysis.

Method Step 4(Alternative): Application—On-line Optimization of the Process by Means of SOM As an alternative to the above described step 4, it is possible to realize an on-line optimization of the process for each point on the map, and therefore for each process state, by predefining a process variable combination to move the process in the desired direction. In this context, desired direction means that the process on the map, starting from the current winner neuron, is to be moved, for example, in the direction NORTH, EAST, SOUTH or WEST (cf. FIG. 2).

This is possible since, as mentioned above, a unique process variable combination can be allocated in the weights of the respective winner neuron and its north, east, south and west neighbors on the map. Starting from this allocation, it is possible therefore to predefine the process variable change which is necessary to move the process in the INTENDED direction. In this way, the plant process can be brought back step by step into the reference channel.

Figure 4:
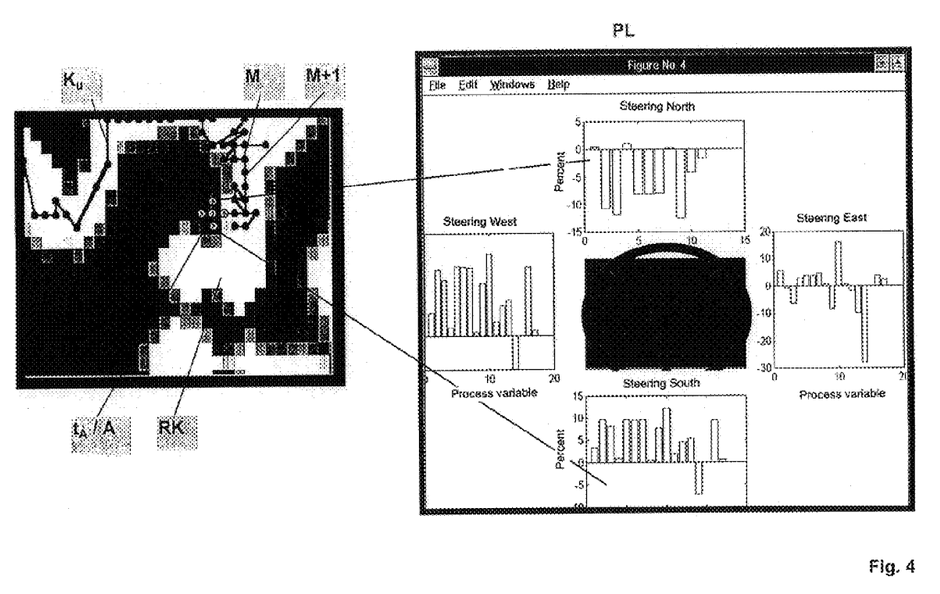
FIG. 4 shows a process steering means which can move the plant process through the channel.

FIG. 4 shows an example of bringing the plant process back into the reference channel. The process event, represented as trajectory $K_u$ has passed outside the reference channel RK at a time $t_A$, and has the state A. By connecting up a process steering means PL, the event can be brought back into the reference channel by prescribing the desired direction. In the example, the process would have to be moved in the EAST direction on the map, since this is the shortest way back into the channel. A process steering means is a software tool which operates on the SOM map and, for each neuron on the map, prescribes the necessary process variable changes in order to reach the adjacent neurons and therefore the adjacent process states. In this case, the process steering means is able to distinguish between manipulated variables and measured variables, since this can be derived from the signal types. This makes it possible to prescribe the necessary value changes only for the manipulated variables.

The process states M and M+1 illustrated in FIG. 4 represent two arbitrary chronologically successive states that are connected to each other on the map.

Method Step 5: Automatic Detection of Process Deviations

Figure 5:
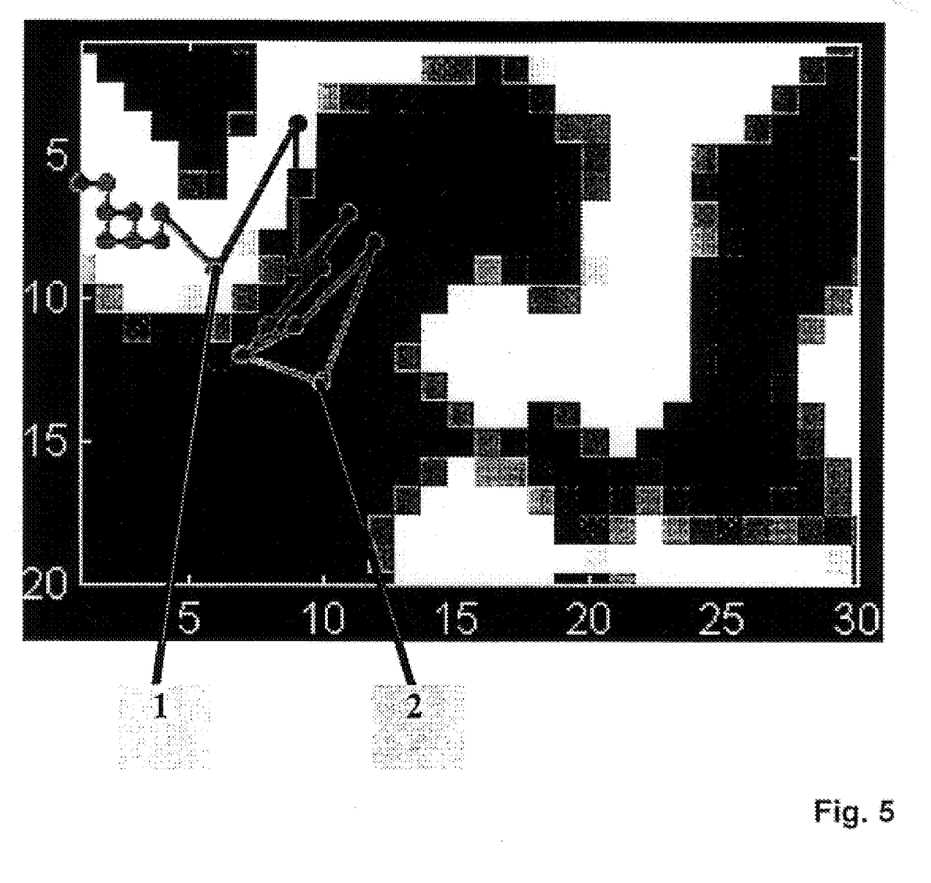
FIG. 5 shows a trajectory course with good (1) and poor (2) process states.

According to the above-described procedure, the deviation of the process event from the reference channel is ascertained only visually. However, it is also possible to automate the fault detection by performing a calculation for each current process state to determine whether it is located in the channel, at the edge, or outside the reference channel. This calculation is made by calculating the associated winner rate for the current winner neuron. If the winner rate is high, the neuron, and therefore the current process state, is in the reference channel. If the winner rate is low or ZERO, the current state is outside the channel. It is thus possible for a fault to be detected automatically. FIG. 5 shows an illustrative example. State 1 is a good state and state 2 is a process state that has deviated from a good state, since the associated neuron is located outside the channel. The winner rate for the neuron in state 2 is zero. The SOM system can therefore automatically generate a fault report for state 2.

Once a deviation has been detected, an automatic fault correction or optimization of the process can be carried out using method step 4.

Overall Method

By applying this method, which can be performed in real-time, a human process operator is given the option of recognizing or registering highly complex, dynamic processes intuitively by himself, and of optimizing them in a manner which is very easy to understand.

A further advantage of the method resides in the low engineering outlay. Since the method completely provides the learning and structuring of the maps, and also sets up a reference channel, complicated engineering of reference models of the plant are dispensed with. This is because the reference channel corresponds to a reference model for the good states of a plant, including an adjustable tolerance band. This form of engineering is an integral component of the method itself.

I claim:

1. A method for controlling process events of a technical plant, which comprises:

collecting variables relevant to a process;

realizing a topology-maintaining nonlinear projection of data from the variables onto a multidimensional self-organizing neural map;

displaying a trajectory of process events by connecting visualized process states graphically;

displaying reference channels with adjustable tolerance widths on the map;

evaluating the variables in relation to one another using the neural map;

controlling process events in accordance with the evaluating step;

evaluating sequences of process states using the reference channels;

detecting if a trajectory deviates from one of the reference channels;

evaluating a winner rate neuron representing a state; and bringing the process back into the reference channel.

2. A method of controlling process events of a technical plant, comprising:

selecting process variables;

developing a self-organizing, neural network in a state space of a plant, on a basis of a self-organizing neural algorithm using process values of the process variables;

representing the self-organizing neural network as a neural map;

determining plant states from the process variables;

producing a reference channel of permissible process events by projecting the plant states onto the neural map;

recording the process events by linking the neural map to a process of the plant;

displaying a trajectory on the neural map;

monitoring whether the trajectory remains within or deviates from the reference channel; and steering the process of the plant over the neural map in real terms in the state space.

3. The method of controlling plant states according to claim 2, wherein the projection step comprises projecting the plant states onto the neural map with a winner-takes-all algorithm.

4. The method of controlling plant states according to claim 2, wherein the projection step comprises projecting the plant states onto the neural map with a winner-takes-most algorithm.

5. The method of controlling plant states according to claim 2, wherein the steering step comprises steering the process over the map by using a process steering means.

6. The method of controlling plant states according to claim 2, which further comprises conditioning the process values of the process variables prior to the developing step.

* * * * *

UNITED STATES PATENT AND TRADEMARK OFFICE
CERTIFICATE OF CORRECTION

PATENT NO. : 6,314,413 B1
DATED : November 6, 2001
INVENTOR(S) : Ralf Otte

Page 1 of 1

It is certified that error appears in the above-identified patent and that said Letters Patent is hereby corrected as shown below:

<u>Title page,</u>
Item [54] should read as follows:

-- METHOD FOR CONTROLLING PROCESS EVENTS --

Signed and Sealed this

Twenty-sixth Day of March, 2002

Attest:

*Attesting Officer*

JAMES E. ROGAN
*Director of the United States Patent and Trademark Office*